US005955791A

United States Patent [19]

Irlander

[11] Patent Number: 5,955,791

[45] Date of Patent: Sep. 21, 1999

[54] MASTER/SLAVE CIRCUIT FOR DUST COLLECTOR

[76] Inventor: James E. Irlander, 3353 Saddle Ridge Ct., St. Charles, Mo. 63301

[21] Appl. No.: 08/843,254

[22] Filed: Apr. 14, 1997

[51] Int. Cl.[6] .................... H02J 1/00

[52] U.S. Cl. .................... 307/38; 307/41; 307/116; 361/160

[58] Field of Search .................... 307/38, 39, 41, 307/112, 116, 125, 114, 115; 361/160, 166

[56] References Cited

U.S. PATENT DOCUMENTS

| | | | |
|---|---|---|---|
| 3,416,001 | 12/1968 | Fistell | 307/112 |
| 4,054,802 | 10/1977 | Mock | 307/38 |
| 4,825,140 | 4/1989 | St. Louis | 323/237 |
| 5,099,157 | 3/1992 | Meyer | 327/456 |
| 5,120,983 | 6/1992 | Samann | 307/38 |
| 5,256,906 | 10/1993 | Tsuge et al. | 307/39 |
| 5,270,576 | 12/1993 | Kahle | 307/131 |
| 5,541,457 | 7/1996 | Morrow | 307/38 |
| 5,563,455 | 10/1996 | Cheng | 307/41 |
| 5,598,039 | 1/1997 | Weber | 307/38 |
| 5,615,107 | 3/1997 | DeAngelis | 364/141 |
| 5,644,174 | 7/1997 | Cheng et al. | 307/41 |

OTHER PUBLICATIONS

Product Literature for Craftsman "Tool Vac". Available in all Sears Department Stores.

Advertisement in Jun. 1998 American Wood Worker for Feih Power Tools Pittsburgh, PA "Feih Turbo II" Automatic.

Trend–lines Tool Catalog. p. 11 of Catalog 527A1 Vacuum for Shop–Vac "On Demand" 4 Hp Vacuum. Trend–lines Revere, MA 800–877–7899.

*Primary Examiner*—Jeffrey Gaffin

*Assistant Examiner*—Jonathan S. Kaplan

[57] ABSTRACT

A mechanism for switching from independent to synchronous, or vice versa an operational circuit for supplying power to an electric dust collector (Slave) when an electric power tool (Master) is operated. In independent mode, power is supplied to both the electric power tool and the electric dust collector at all times. In synchronous mode, power is supplied to the electric power tool at all times. The current drawn by the electric power tool is directed through a coil of an electromagnetic relay. When the electric power tool is operated, the current flowing through the coil of the electromechanical relay creates a magnetic field which operates the contact of the electromechanical relay. The contact of the electromagnetic relay directs power to an electric dust collector.

7 Claims, 3 Drawing Sheets

MASTER/SLAVE CIRCUIT FOR DUST COLLECTOR

BACKGROUND—FIELD OF INVENTION

This invention relates to an electric circuit capable of manually or automatically switching another circuit, specifically to operate an electric dust collector either independently or synchronous with an electric power tool that generates dust or chips.

BACKGROUND—DESCRIPTION OF PRIOR ART

Master/Slave electrical circuits have been known for some time, in particular to energize an electric dust collector when an electric power tool is operated. Such an arrangement is described hereafter in more detail with reference to an electric power tool (Master) generating dust or chips in combination with an electric dust collector (Slave) intended for collecting such dust or chips.

U.S. Pat. No. 5,099,157 to Meyer (1992) discloses a Master/Slave circuit utilizing a Triac in series with both the Master electric load and the Slave electric load. The disadvantages of such a circuit are detailed in the background of U.S. Pat. No. 5,120,983 to Samann (1992). U.S. Pat. No. 5,120,983 to Samann (1992) discloses a Master/Slave circuit utilizing a Triac in series with the Slave electric load. The gate of the Triac is triggered by the voltage generated by a current transformer when the current in the Master circuit flows through the core of the current transformer.

Both U.S. Pat. No. 5,099,157 to Meyer (1992) and U.S. Pat. No. 5,120,983 to Samann (1992) utilize circuits with semi-conductors capable of conducting the large quantity of current drawn by most electric power tools and electric dust collectors with induction motors. The associated circuitry connected to the gate of the Triac in U.S. Pat. No. 5,120,983 to Samann (1992) insures that the Triac operates within its specified current and voltage parameters. The simplified circuitry of U.S. Pat. No. 5,099,157 to Meyer (1992) does not insure that the Triacs operate within their specified current and voltage range.

U.S. Pat. No. 5,256,906 to Tsuge et al. (1993) discloses a Master/Slave electrical circuit using a current transformer and associated circuitry to sense the current being supplied to the Master circuit and switch the power to the Slave circuit accordingly. This circuit is integral with the dust collector. Therefore, the circuit can not be utilized with another dust collector.

U.S. Pat. No. 5,541,457 to Morrow (1996) also discloses a Master/Slave electrical circuit using a current transformer and associated circuitry to sense the current being supplied to the Master circuit and switch the power to the Slave circuit accordingly. The circuit also incorporates a direct current (DC) power supply to provide power to certain DC components of the circuit including a DC electromagnetic relay which switches the power to the Slave circuit.

These aforementioned patents all utilize a Master/Slave circuit arrangement capable of automatically switching the power to a Slave circuit when electric current is being drawn by the Master circuit. Specifically, they are capable of automatically energizing an electric dust collector when an electric power tool is operated. All of the aforementioned patents suffer from a number of disadvantages.

(a) The circuits utilize semi-conductors and solid-state electronic components. These components are susceptible to damage when they are exposed to electric currents and voltages that are not within their allowable operating range. Both electric dust collectors and electric power tools utilize induction motors which draw excessive current before they reach their operating speed. A voltage drop in the circuit is the direct result of this excessive starting current.

(b) The circuits are designed such that both the Master electric load and the Slave electric load are supplied from the same electric source. With this arrangement, the electric power tool and the electric dust collector collectively can not draw more current than the electric source can provide.

(c) The circuits are designed such that both the Master electric load and the Slave electric load must operate at the same voltage. Some electric power tools and electric dust collectors have large induction motors which require the power to be supplied at a higher voltage to reduce the amount of current drawn by the power tool or the dust collector.

(d) The circuits, except for U.S. Patent to Morrow (1996), utilize semi-conductors capable of conducting the large quantity of current required by most electric power tools and electric dust collectors. These semi-conductors are commercially available, but they are expensive.

OBJECTS AND OBJECTIVES

Accordingly, several objects and advantages of my invention are:

(a) to provide a circuit which functions reliably within the same current and voltage ranges that most single phase electric power tools operate;

(b) to provide a circuit which the Master electric load and the Slave electric load can be connected to separate electric sources;

(c) to provide a circuit which the Master electric load can be supplied with electricity at a different voltage than the electricity supplied to the Slave electric load; and (d) to provide a circuit which utilizes a small number of components as well as utilizing inexpensive components such that the Master/Slave circuit can be manufactured at a reasonable cost.

Further objects and advantages are to provide a basic circuit which can be modified to suit a wide range of Master/Slave electrical requirements. Such a Master/Slave circuit can be constructed such that it can be as simple to operate as an extension cord with two receptacles. Such a Master/Slave circuit can be constructed such that the Master electric circuit supplies plural receptacles wired in parallel as that which is typically provided in a single phase distribution circuit. Plural electric power tools can be connected to the receptacles as desired. Such a Master/Slave circuit can be constructed such that the amount of current drawn by the Master load has to be sufficient enough to switch the power to the Slave circuit. For example, the small current drawn by an incandescent light or other light source would not be sufficient to switch the power to the Slave circuit. Still further objects and advantages will become apparent from a consideration of the ensuing description and drawings.

DRAWING FIGURES

Other advantages of the present invention will be apparent as the following detailed description is considered along with the accompanying drawings in which:

FIG. 1 is a simplified Master/Slave circuit diagram.

FIG. 2 adds further components and substitutes one component to improve the operation of the circuit in FIG. 1.

FIG. 3 substitutes even more components to further improve the operation of the circuit in FIG. 2.

REFERENCE NUMERALS IN DRAWINGS

In the drawings, closely related components have the same number with different alphabetic suffixes.

12 main supply plug
RYA single winding relay
14A single winding coil of relay RYA
16A contact set of relay RYA
RYB dual winding relay
14B dual winding coil of relay RYB
16B contact set of relay RYB
18 Slave receptacle
20 Master receptacle
SW1 double pole double throw (dpdt) switch
22 first contact set of dpdt switch SW1
24 second contact set of dpdt switch SW1
SW2 single pole double throw (spdt) switch
26 contact set of spdt switch SW2
28 Slave indicator light
30 Master indicator light
SW3 double pole triple throw (dptt) switch
32 first contact set of dptt switch SW3
34 second contact set of dptt switch SW3
36 Slave supply circuit
38 Master supply circuit
LC1 Slave load circuit
LC2 Master load circuit

DESCRIPTION OF THE PREFERRED EMBODIMENT

Figure 1:
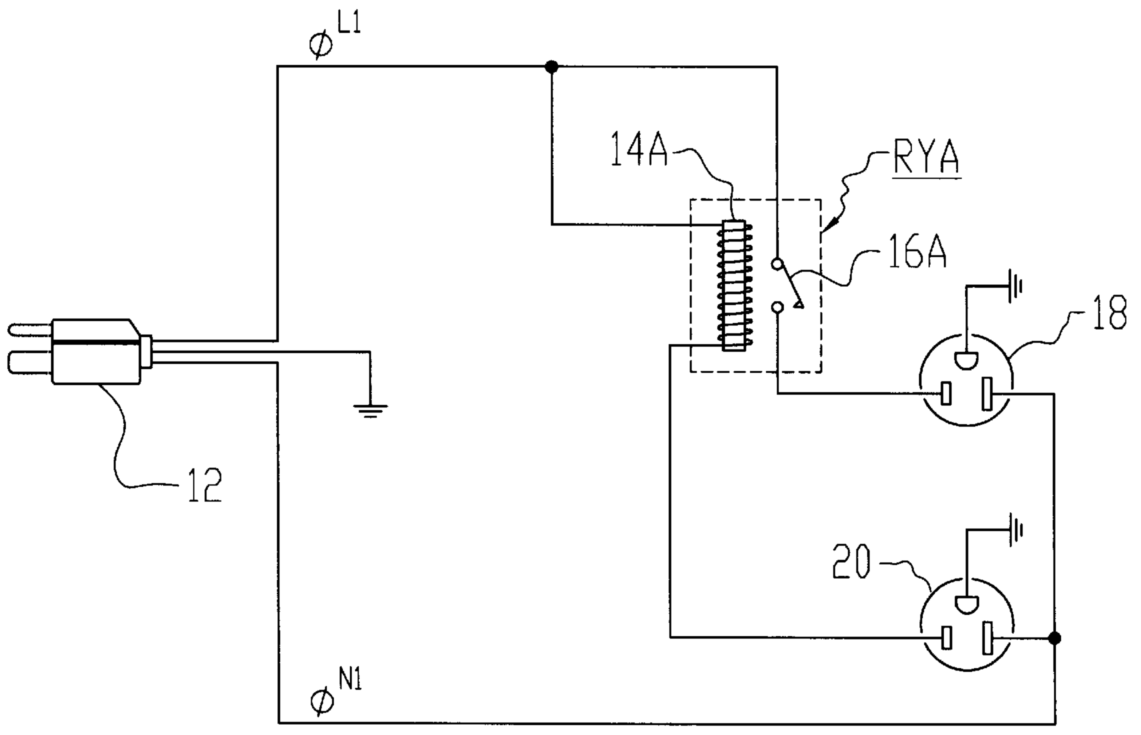

In FIG. 1, the simplest Master/Slave circuit is provided. A main supply plug 12 supplies power via Line L1 and Line N1 to both a Slave receptacle 18 and a Master receptacle 20 which are connected in parallel with each other. A single winding coil 14A of a single winding relay RYA is connected in series with Line L1 supply to Receptacle 20. A contact set 16A of Relay RYA is connected in series with the Line L1 supply to Receptacle 18. An electric dust collector can be connected to Receptacle 18 and prepared such that the electric dust collector will operate whenever voltage is present at Receptacle 18. An electric power tool, such as a sander or a router, can be connected to Receptacle 20. Electric current flows through Line L1 to Receptacle 20 whenever the electric power tool is operated. Contact 16A closes when the magnitude of the current flowing through Coil 14A is greater than the minimum current required to produce a sufficient magnetic field to operate Relay RYA. The strength of the magnetic field generated by Coil 14A is directly proportional to both the number of turns of Coil 14A and the magnitude of current flowing through Coil 14A.

Figure 2:
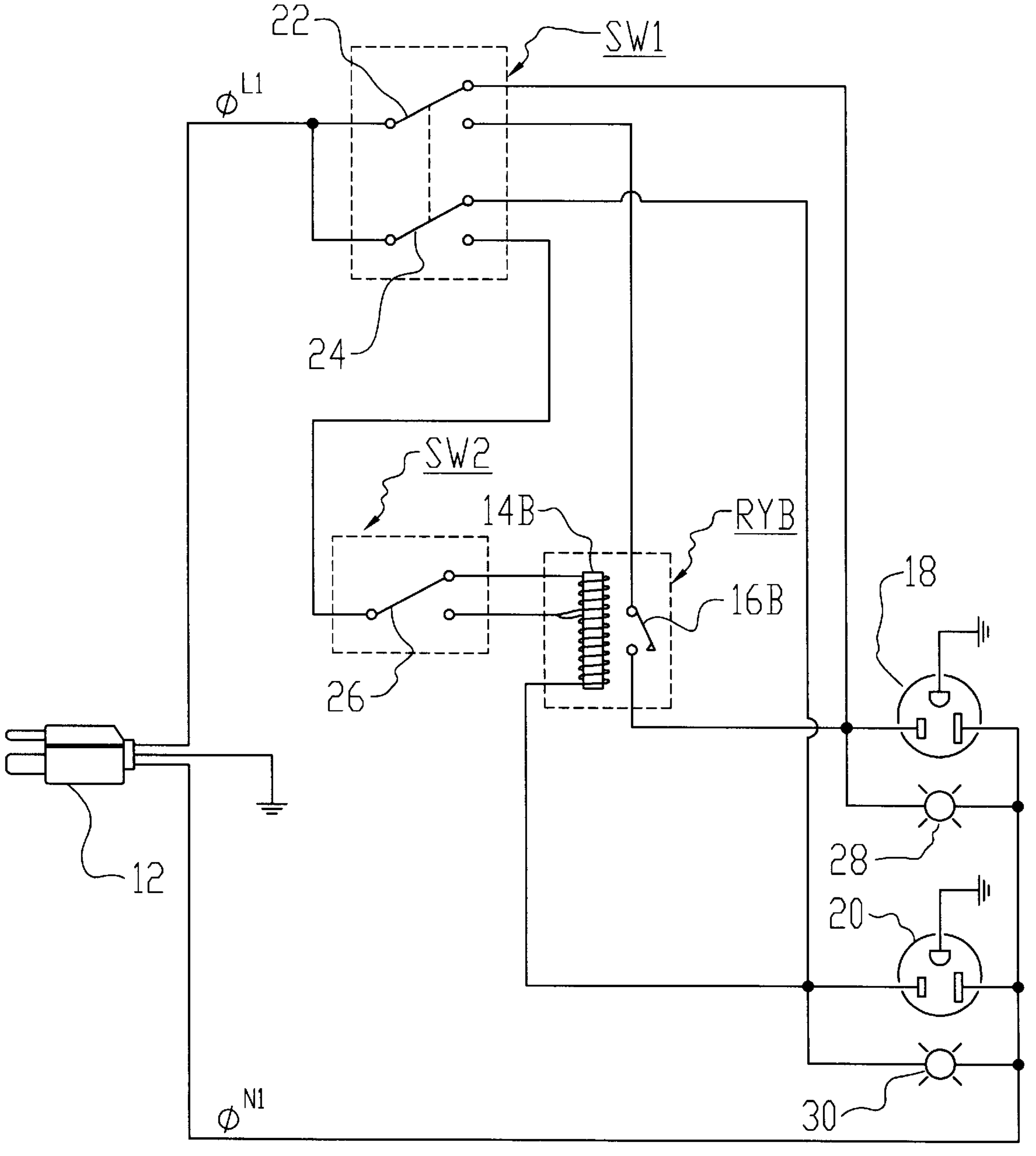

In FIG. 2, the Master/Slave circuit is modified from that in FIG. 1. Plug 12 supplies power via Line L1 and Line N1 to both Receptacle 18 and Receptacle 20 which are connected in parallel with each other. A Slave indicator light 28 is added directly in parallel with Receptacle 18 to indicate when voltage is present at Receptacle 18. A Master indicator light 30 is added directly in parallel with Receptacle 20 to indicate when voltage is present at Receptacle 20. A double pole double throw switch SW1 is added to the circuit in series with Line L1 immediately after Plug 12. Switch SW1 directs Line L1 supply to Receptacle 18 and Receptacle 20. With Switch SW1 in the upper position, Line L1 is directly connected by a first contact set 22 to Receptacle 18 and Light 28, and Line L1 is directly connected by a Second contact set 24 to Receptacle 20 and Light 30. Line L1 is also directed by Contact 24 to a contact set 26 of a single pole double throw switch SW2. With Switch SW1 in the lower position, Line L1 is directed by Contact 22 to a contact set 16B of a dual winding relay RYB. Line L1 is then directed to Receptacle 18 when Contact 16B is closed. Line L1 is also directed from Contact 26 through either one winding or both windings of a Coil 14B, dependent upon the position of Switch SW2, and then directed to Receptacle 20. With Switch SW2 in the upper position, Line L1 is directed through both windings of Coil 14B in series with each other. The effective winding is the sum of the two windings of Coil 14B. With Switch SW2 in the lower position, Line L1 is directed through the second winding of Coil 14B.

Figure 3:
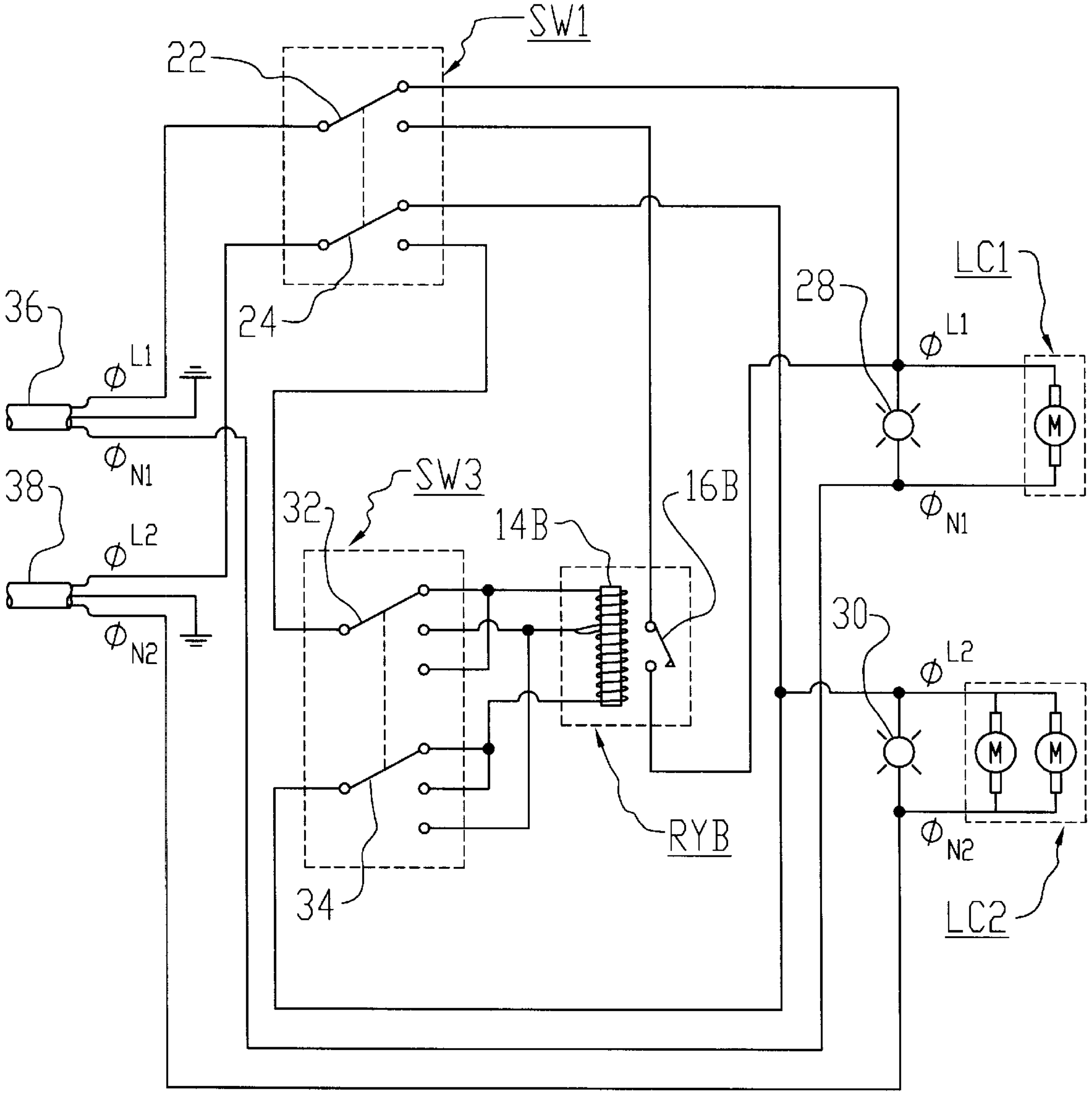

In FIG. 3, the Master/Slave circuit is further modified from that in FIG. 2. A Slave supply circuit 36 and a Master supply circuit 38 replaces Plug 12 in FIG. 2. This allows for complete isolation of the two supply circuits such that the circuits can be supplied at different voltages if desired. Line L1 from circuit 36 is connected to Contact 22 of Switch SW1. Line N1 from Circuit 36 is directly connected to a Slave load circuit LC1 and Light 28. Circuit LC1 replaces Receptacle 18 in FIG. 2. Circuit LC1 can have more than one motor connected in parallel as desired, but only one motor symbol is shown. Line L2 from Circuit 38 is connected to Contact 24 of Switch SW1. Line N2 from Circuit 38 is directly connected to a Master load circuit LC2 and Light 30. Circuit LC2 replaces Receptacle 20 in FIG. 2. Circuit LC2 can have as many motors connected in parallel as desired, but only two motor symbols are shown. When Switch SW1 is in the upper position, Line L1 is directly connected from Contact 22 to Circuit LC1 and Light 28, and Line L2 is directly connected from Contact 24 to Circuit LC2 and Light 30. When Switch SW1 is in the lower position, Line L1 is connected from Contact 22 to Contact 16B of Relay RYB and then on to Circuit LC1 and Light 28, and Line L2 is connected to a First contact set 32 of a Double pole triple throw switch SW3. Line L2 is directed through either the first winding, the second winding, or both windings of Coil 14B, dependent upon the position of Switch SW3. Line L2 is then connected from a Second contact set 34 to Circuit LC2 and Light 30. When Switch SW3 is in the upper position, Line L2 is directed through both windings of Coil 14B connected in series with each other. The effective winding is the sum of the two windings of Coil 14B. When Switch SW3 is in the middle position, Line L2 is directed through only the second winding of Coil 14B. When Switch SW3 is in the lower position, Line L2 is directed through only the first winding of Coil 14B.

Conclusion, Ramifications, and Scope of Invention

Accordingly, the reader will see that the Master/Slave circuit of this invention provides a reliable, adaptable, and economical device that does not require that the operator have considerable electrical knowledge in order for the device to be operated properly.

While my above description contains many specificities, these should not be construed as limitations on the scope of the invention, but rather as an exemplification of one preferred embodiment thereof. Many other variations are possible.

For example, the winding combination of the dual winding coil of the relay can be optimized for a specific range of operating current drawn by the Master electric load. An optimized dual winding coil insures that the voltage drop across the dual winding coil stays well below that which is referenced as acceptable for sizing electrical conductors in extension cords.

For example, the Slave circuit can switch power to other electrical components as well as an electric dust collector. A solenoid valve can be operated by the Slave circuit such that compressed air, cutting lubricant, or any fluid can be supplied to the workpiece when the electric power tool is operated.

For example, the components of the circuit can be provided such that all components are rated to withstand the maximum operating voltage of standard single phase electric power tools or standard single phase electric dust collectors. Accordingly, the Master/Slave circuit can be connected to any combination of standard single phase electric supply circuits as necessary during installation of the Master/Slave circuit.

Accordingly, the scope of the invention should be determined not by the embodiments illustrated, but by the appended claims and their legal equivalents.

What is claimed is:

1. A master load/slave load circuit comprising:

a master electric load having a master first side and a master second side;

a slave electric load having a slave first side and a slave second side;

a relay comprising a coil containing a winding having a sufficient number of turns to create a magnetic field when an electric current flows through said winding of said coil to said master electric load;

said relay containing a first coil terminal and a second coil terminal;

means for connecting said first coil terminal to a power source;

means for connecting said second coil terminal to said master first side;

said relay further comprising a contact set containing a first contact terminal and a second contact terminal;

means for connecting said first contact terminal to said power source;

means for connecting said second contact terminal to said slave first side, whereby said contact set is magnetically coupled to said coil;

said contact set being magnetically actuated by said magnetic field produced when an electric current flowing to said master electric load flows through said winding of said coil;

whereby said slave electric load is operated in synchronous with said master electric load.

2. The master load/slave load circuit of claim 1 further comprising a first switch configured to bypass said relay, said first switch having a first switch pair of contacts connecting said slave electric load and said master electric load to said power source independently; and a first switch second pair of contacts connecting said power source to said relay including said first coil terminal and said first contact terminal.

3. The master load/slave load circuit of claim 2 further comprising a second switch configured to bypass a portion of the turns of said winding of said coil in said relay, said second switch having a second switch first pair of contacts connecting said power source to all turns of said winding of said coil in said relay; and a second switch second pair of contacts connecting said power source to a portion only of the turns of said winding of said coil in said relay.

4. The master load/slave load circuit of claim 2 further comprising at least one first light in parallel with said master load to indicate when current is flowing to said master load.

5. The master load/slave load circuit of claim 4 further comprising at least one second light in parallel with said slave load to indicate when current is flowing to said slave load.

6. The master load/slave load circuit of claim 2 wherein separate power sources are provided for said master load and said slave load.

7. The master load/slave load circuit of claim 2 further comprising a second switch configured to bypass a portion of the turns of said winding of said coil in said relay, said second switch having a second switch first pair of contacts connecting said power source to all turns of said winding of said coil in said relay; a second switch second pair of contacts connecting said power source to a first portion only of the turns of said winding of said coil in said relay, and a second switch third pair of contacts connecting said power source to a second portion only of the turns of said winding of said coil in said relay.

* * * * *